(12) United States Patent
Diao et al.

(10) Patent No.: US 7,756,535 B1
(45) Date of Patent: Jul. 13, 2010

(54) LIGHTWEIGHT CONTENT FILTERING SYSTEM FOR MOBILE PHONES

(75) Inventors: Lili Diao, Nanjing (CN); Jackie Cao, Nanjing (CN); Vincent Chan, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 912 days.

(21) Appl. No.: 11/483,073

(22) Filed: Jul. 7, 2006

(51) Int. Cl.
*H04W 4/00* (2009.01)
*G06F 15/16* (2006.01)
*H04L 12/58* (2006.01)

(52) U.S. Cl. .................. 455/466; 709/206; 455/412.1

(58) Field of Classification Search ............... 455/466, 455/412.1; 709/206
See application file for complete search history.

(56) References Cited

U.S. PATENT DOCUMENTS

| | | | |
|---|---|---|---|
| 5,442,699 A | 8/1995 | Arnold et al. | |
| 5,452,442 A | 9/1995 | Kephart | |
| 5,640,492 A | 6/1997 | Cortes et al. | |
| 5,649,068 A | 7/1997 | Boser et al. | |
| 5,907,834 A | 5/1999 | Kephart et al. | |
| 6,161,130 A | 12/2000 | Horvitz et al. | |
| 6,192,512 B1 | 2/2001 | Chess | |
| 6,279,128 B1 | 8/2001 | Arnold et al. | |
| 6,622,134 B1 | 9/2003 | Sorkin | |
| 6,650,890 B1 | 11/2003 | Irlam et al. | |
| 6,711,583 B2 | 3/2004 | Chess et al. | |
| 6,732,157 B1 | 5/2004 | Gordon et al. | |
| 6,778,941 B1 * | 8/2004 | Worrell et al. | 702/176 |
| 6,789,200 B1 | 9/2004 | Fiveash et al. | |
| 6,813,712 B1 | 11/2004 | Luke | |
| 7,076,527 B2 * | 7/2006 | Bellegarda et al. | 709/206 |
| 7,089,429 B2 * | 8/2006 | Gustafsson | 709/230 |
| 7,426,510 B1 * | 9/2008 | Libenzi et al. | 707/6 |

(Continued)

FOREIGN PATENT DOCUMENTS

EP  1 377 892 B1  9/2004

(Continued)

OTHER PUBLICATIONS

Spam Assassin 2.64, Aug. 2004, 4 sheets. Webpage [online] [retrieved on Sep. 7, 2004]. Retrieved from the internet:: <URL:http://www.spamassasin.apache.org.html>.

(Continued)

*Primary Examiner*—Vincent P Harper
*Assistant Examiner*—Marisol Figueroa
(74) *Attorney, Agent, or Firm*—Okamoto & Benedicto LLP

(57) ABSTRACT

In one embodiment, a content filtering system includes a feature list and a learning model. The feature list may be a subset of a dictionary that was used to train the content filtering system to identify classification (e.g., spam, phishing, porn, legitimate text messages, etc.) of text messages during a training stage. The learning model may include representative vectors, each of which represents a particular class of text messages. The learning model and the feature list may be generated in a server computer during the training stage and then subsequently provided to the mobile phone. An incoming text message in the mobile phone may be parsed for occurrences of feature words included in the feature list and then converted to an input vector. The input vector may be compared to the learning model to determine the classification of the incoming text message.

16 Claims, 3 Drawing Sheets

U.S. PATENT DOCUMENTS

2006/0259543 A1* 11/2006 Tindall .................. 709/203
2007/0233463 A1* 10/2007 Sparre .................. 704/10

FOREIGN PATENT DOCUMENTS

WO    WO 02/084459 A1    10/2002

OTHER PUBLICATIONS

The Formulation of Support Vector Machine, 1998, 2 sheets [retrieved on Jul. 21, 2004]. Retrieved from the internet: <URL:http://www.mi-eng.cam.ac.uk/kkc21/main/node8.html>.

New Advance Anti-Spam Service, "Aladdin Knowledge Systems Launches New Advanced Anti-Spam Service" Jun. 26, 2003, 3 sheets. Webpage [online] [retrieved on Jul. 21, 2004]. Retrieved from the internet: <URL:http://www.ealladin.com/new/2003/esafe/anti-spam.asp.html>.

SVM-Light Support Vector Machine 6.01, Feb. 2004, 14 sheets. Webpage [online][retrieved on Sep. 9, 2004]. Retrived from the internet: <URL:http://www.cs.cornell.edu/People/tj/svm_light/html>.

Steve Ramsay's Guide to Regular Expressions, Electronic Text Center, University of Virginia, 12 sheets [retrieved on Sep. 2, 2004]. Retreived from the internet: <URL:http://www.etext.lib.virginia.edu/helpsheets/regex.html>.

Dik L. Lee, et al. "Document Ranking and the Vector-Space Model", Mar./Apr. 1997, pp. 67-75, Hong Kong University of Science & Technology, Dept. of Computer Science, Hong Kong.

* cited by examiner

LIGHTWEIGHT CONTENT FILTERING SYSTEM FOR MOBILE PHONES

BACKGROUND OF THE INVENTION

1. Field of the Invention

The present invention relates generally to content filtering systems, and more particularly but not exclusively to content filtering systems operable on mobile phones.

2. Description of the Background Art

Mobile wireless devices facilitate communication between individuals, and dissemination of information in general. Some mobile wireless devices, such as mobile phones, even have the capability to receive not just voice communications but text messages as well. Text messaging has become very popular because of its relatively low cost of operation and convenience. As a result, mobile phones that are operable to receive Short Message Service (SMS) text messages are widely commercially available.

Malicious individuals, such as fraudsters, hackers, and spammers, are quick to take advantage of the anonymity and fast communication provided by wireless telephone networks. Just like on the Internet, these malicious individuals may send phony messages to advance fraudulent schemes (commonly known as "phishing"), unsolicited messages (commonly known as "spam"), and other malicious messages. Content filtering systems for combating malicious messages in general purpose computers, such as desktop computers and servers, are commercially available from several antivirus vendors. These content filtering systems, however, are generally too big and resource intensive for use in mobile phones. While mobile phones have become popular, they are still resource limited compared to general purpose computers. More particularly, most mobile phones have limited amounts of main memory (e.g., less than 1 MB), have relatively small file systems, and have slower CPU, which may or may not have floating point capability.

SUMMARY

In one embodiment, a content filtering system includes a feature list and a learning model. The feature list may be a subset of a dictionary that was used to train the content filtering system to identify classification (e.g., spam, phishing, porn, legitimate text messages, etc.) of text messages during a training stage. The learning model may include representative vectors, each of which represents a particular class of text messages. The learning model and the feature list may be generated in a server computer during the training stage and then subsequently provided to the mobile phone. An incoming text message in the mobile phone may be parsed for occurrences of feature words included in the feature list and then converted to an input vector. The input vector may be compared to the learning model to determine the classification of the incoming text message.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

Embodiments of the present invention pertain to a lightweight content filtering system. The content filtering system is lightweight in that is designed to operate on devices that have limited resources. As such, embodiments of the present invention are described in the context of mobile phones. It should be understood, however, that the present invention may also be adapted for use in similar resource limited devices or in non-resource limited devices requiring high-performance.

Figure 1:
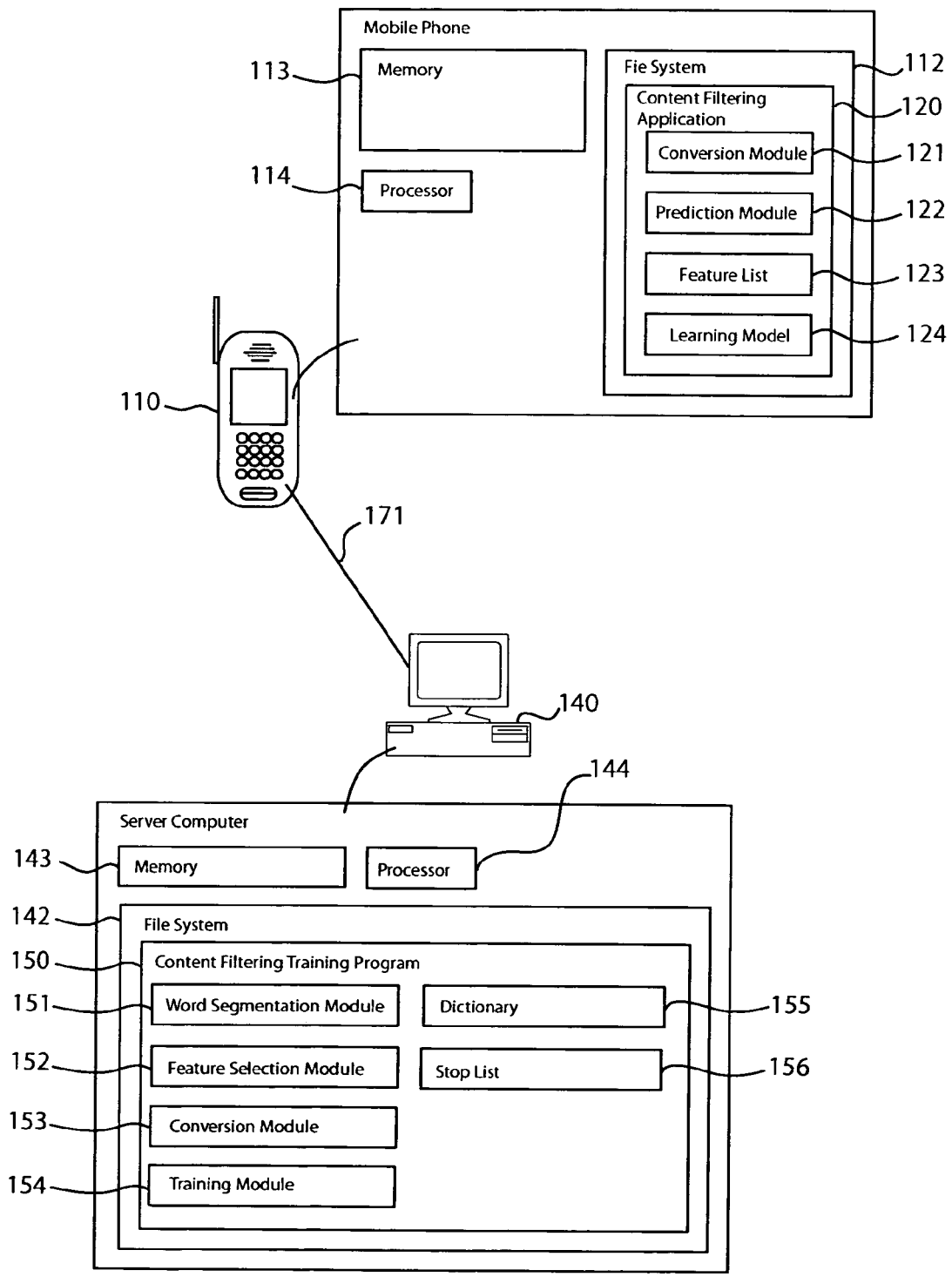
FIG. 1 shows a mobile phone and a server computer in accordance with an embodiment of the present invention.

Referring now to FIG. 1, there is shown a mobile phone 110 and a server computer 140 in accordance with an embodiment of the present invention. In the example of FIG. 1, the mobile phone 110 comprises a main memory 113 (e.g., random access memory), a processor 114, and a file system 112. The file system 112 may comprise non-volatile storage (e.g., hard disk, flash) for files and other data units. In the example of FIG. 1, the file system 112 includes a content filtering application 120, which in turn comprises a conversion module 121, a prediction module 122, a feature list 123, and a learning model 124. One or more components of the content filtering application 120 may be loaded onto the main memory 113 for execution or processing by the processor 114. As will be more apparent below, the content filtering application 120 comprises a lightweight application in that it is configured to operate in a resource limited environment, such as the mobile phone 110. Other components of the mobile phone 110 are not shown for clarity of illustration. For example, the mobile phone 110 may include additional components found in conventional mobile phones.

The conversion module 121 may comprise computer-readable program code for converting an incoming text message into a form suitable for processing by the prediction module 122. In one embodiment, the conversion module 121 parses a text message for presence of features included in the feature list 123. The features may comprise words or phrases indicative of a particular class (e.g., phishing, spam, porn, legitimate) of text messages. The conversion module 121 may identify features in the text message and convert the text message into a vector with the identified features as fundamental units (also referred to as "items"). Identification of features in the text message may be performed by string matching. Depending on what language the text message is in, the conversion module 121 may have to first segment the text message into individual words or phrases before parsing the text message for particular features. For example, a text message in the Chinese language may have to be segmented, while segmentation is not necessary with text messages written in the English language.

The prediction module 122 may comprise computer-readable program code for identifying the class of a text message. For example, the prediction module 122 may be configured to determine whether a text message received in the mobile phone 110 is spam, phishing, porn, legitimate, or some other message. The prediction module 122 may determine the class of the incoming text message by comparing it to other text messages representative of classes of text messages. In one embodiment, the prediction module 122 receives an input vector of an incoming text message (generated by the conversion module 121) and compares the input vector to representative vectors of the learning model 124. The representative vectors may each represent a typical text message of a particular class of text messages. For example, the learning model 124 may include a representative vector for a typical spam text message, another representative vector for a typical phishing text message, another representative vector for a legitimate message, and so on. The prediction module 122 may determine the similarity of the input vector to representative vectors. The input vector, and the received text message it represents, may be deemed as belonging to the same class as the representative vector most similar to it. For example, if the input vector is most similar to the representative vector of a spam, then the prediction module 122 may classify the received text message as spam and act on the text message accordingly (e.g., discard, quarantine).

In the example of FIG. 1, the server computer 140 comprises a main memory 143 (e.g., random access memory), a processor 144, and a file system 142. The file system 142 may comprise non-volatile storage (e.g., hard disk, flash) for files and other data units. In the example of FIG. 1, the file system 142 includes a content filtering training program 150, which in turn comprises a word segmentation module 151, a feature selection module 152, a conversion module 153, a training module 154, a dictionary 155, and a stop list 156. The components of the content filtering training program 150 may be loaded onto the main memory 143 for execution or processing by the processor 144. Other components of the computer 140 are not shown for clarity of illustration. For example, the computer 140 may include additional components found in conventional servers and desktop computers.

The word segmentation module 151 may comprise computer-readable program code for parsing sample text messages for the presence of particular words or phrases listed in the dictionary 155. The dictionary 155 may include words or phrases typically found in different classes of text messages. For example, the dictionary 155 may include words or phrases typically included in a spam, such as "save now" or "special offer." The stop list 156, on the other hand, may include words or phrases that don't provide information regarding whether a text message is of a particular classification. The words or phrases in the stop list 156 are typically "meaningless" in terms of content filtering and may include adverbs and prepositions, for example. In one embodiment, the word segmentation module 151 parses sample text messages to identify words or phrases included in the dictionary 155, compile the identified words or phrases in a list of identified words or phrases, and revise the list of identified words or phrases by removing those included in the stop list 156.

Depending on what language the text message is in, the word segmentation module 151 may have to first segment a sample text message into individual words or phrases before parsing the sample text message for particular words or phrases. As mentioned, a text message in the Chinese language may have to be segmented, while segmentation is not necessary with text messages written in the English language.

The feature selection module 152 may comprise computer-readable program code for determining the importance of a word or phrase in classifying a text message. In one embodiment, for each word or phrase in the dictionary 155 identified as being in a sample text message, the feature selection module 152 assigns an importance value indicative of the importance of that identified word or phrase in classifying text messages. The identified words or phrases may then be ranked in order of importance value, with the top ranking words or phrases being selected for content filtering. The words or phrases retained for content filtering are referred to as "features" or "feature words or phrases" and included in a feature list. In effect, the feature selection module 152 prunes the list of identified words or phrases to a smaller, more manageable list of features. In one embodiment, the feature selection module 152 employs a cross-entropy method to generate the feature list. As will be more apparent below, the feature list may be generated in the server computer 140 during the training stage, and used in the mobile phone 110 (see feature list 123 in FIG. 1) during the application stage.

The conversion module 153 may comprise computer-readable program code for converting words or phrases parsed from sample text messages into a form suitable for processing by the training module 154. In one embodiment, the conversion module 153 converts words or phrases from each sample text message into a vector that includes numeric representations of features (terms or tokens as fundamental units for further processing).

The training module 154 may comprise computer-readable program code for generating a learning model from sample text messages. In one embodiment, the training module 154 learns the characteristics of a particular class of text messages using sample text messages and generates a learning model based on that learning. The training module 154 may use machine learning methods to generate learning models, for example. Unlike simple keyword matching, signature matching, and other non-machine learning approaches, use of machine learning is not as easily defeated by malicious individuals.

Generally speaking, machine learning pertains to intelligent algorithms for finding hidden knowledge in data. Machine learning approaches, such as Support Vector Machine (SVM), Neural Networks (NN), and decision trees, may be employed in classification or categorization applications. Machine learning may thus be employed to generate models for content filtering systems. Unfortunately, typical machine learning implementations are relatively complicated and unsuitable for use in mobile phones, where memory, storage, and computational power are limited. For example, some mobile phones have less than 1 MB (usually several hundred KB) of main memory and cannot perform floating point computation. Some of these mobile phones have much lower computational speed and smaller file system volume than general purpose computers (e.g., personal computers).

Therefore, relatively complicated machine learning approaches may not work well in certain mobile phones. As will be more apparent below, embodiments of the present invention adapt relatively simple machine learning methods, such as SIM (abbreviation for "similarity"; cross-angle for measuring similarity between any two text documents in feature space) or Naive Bayesian classifiers, to perform content filtering in resource limited devices. Such simpler machine learning methods generally result in smaller model files and are less computation-intensive compared to their more complicated counterparts. The inventors believe that the relative simplicity of text messages compared to emails allows for the use of relatively simple machine learning algorithms that are focused on performing content filtering on text messages. Of course, more complicated machine learning algorithms may also be employed depending on the resources (e.g., main memory capacity, file system volume, computational speed) of the particular device.

In one embodiment, content filtering in a mobile phone involves two stages, namely, a training stage and an application stage. In the training stage, the content filtering system extracts knowledge from a large amount of training data, which in this embodiment is a plurality of sample text messages. Because the training stage may require relatively large amounts of main memory, file system volume, and computation, the training stage is preferably performed in a general purpose computer (e.g., desktop or server computer) rather than in the mobile phone.

In the application stage, knowledge learned during the training stage of the machine learning process is employed to make a prediction or judgment on new text messages received by the mobile phone (for example, for a received SMS text message, predict if it is legitimate or spam). Knowledge learned in the training stage may be expressed in a relatively concise form that requires relatively simple computation so that it may be deployed in a resource limited device such as the mobile phone.

In the example of FIG. 1, the computer 140 may communicate with the mobile phone 110 over a link 171. The link 171 may be a wireless (e.g., Bluetooth interface, wireless telephone network) or wired (e.g., serial or parallel bus) link. The feature list 123 and learning model 124 may be generated in the computer 140 by the feature selection module 152 and the training module 154, respectively. The content filtering application 120 may originally be stored in the computer 140 and provided to the mobile phone 110 over the link 171. Updates to components of the content filtering application 120 in the mobile phone 110 may be transmitted from the computer 140 to the mobile phone 110 over the link 171. For example, the user of the mobile phone 110 may dial up to the computer 140 to receive the latest feature list 123 or learning model 124. The content filtering application 120 may thus be sold as a product to mobile phone users.

Figure 2:
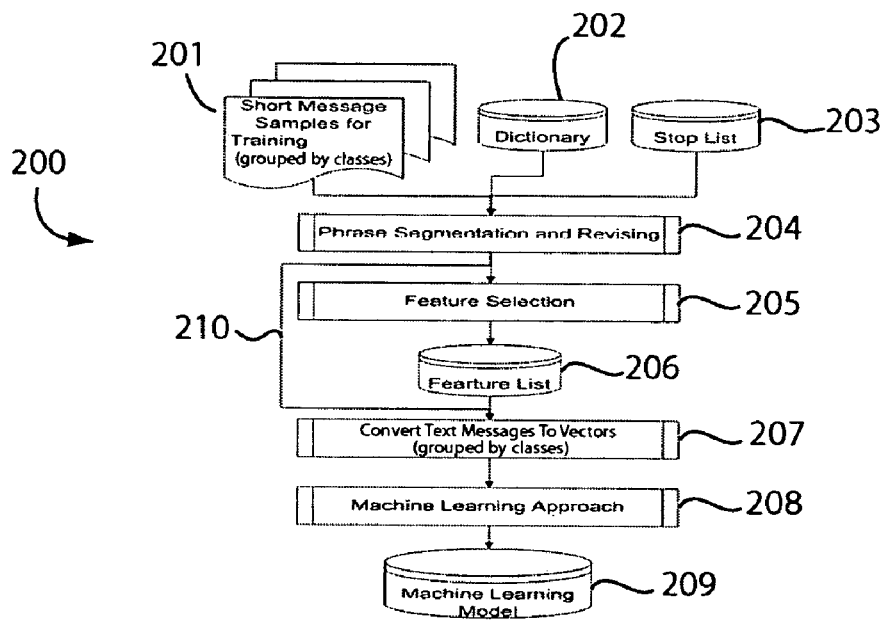
FIG. 2 shows a flow diagram of a method of training a content filtering system to classify text messages, in accordance with an embodiment of the present invention.

FIG. 2 shows a flow diagram of a method 200 of training a content filtering system to classify text messages, in accordance with an embodiment of the present invention. In the example of FIG. 2, the content filtering system is trained to classify short message service (SMS) text messages that may be received in a mobile phone. The method 200 is explained using the components of the server computer 140 shown in FIG. 1. Other components may also be used without detracting from the merits of the present invention.

In one embodiment, the server computer 140 receives a plurality of training data in the form of samples of SMS text messages (see 201). The samples of text messages have been ordered by class. That is, the samples of text messages include a plurality of text messages that are known spam, a plurality of text messages that are known phishing, a plurality of text messages that are known to be porn, a plurality of text messages that are known to be legitimate, and so on. The training data are used to train the content filtering system to identify the different classes of text messages. Accordingly, the training data include samples from each class of text messages the content filtering system is expected to identify. The content filtering system is also trained using a dictionary (see 202) and a stop list (see 203), both of which have been previously described with reference to FIG. 1.

For each class of text messages, the word segmentation module 151 parses the sample text messages to identify words or phrases included in the dictionary, compiles the identified words or phrases in a list of identified words or phrases, and revises the list of identified words or phrases by removing words or phrases listed in the stop list (step 204). At this point, the list of identified words or phrases includes words or phrases listed in the dictionary but not in the stop list.

Although it is advantageous to use the same dictionary in both the training stage and the application stage, the dictionary may be too big to fit in the file system of a resource limited device, such as the mobile phone 110. Accordingly, in one embodiment, the feature selection module 152 generates a feature list that may be employed in the mobile phone 110 in parsing a text message for words or phrases that may be used to determine the class of the text message. The feature list is essentially a subset of the dictionary, and is thus more compact. Because the feature list is generated from the dictionary and the features are used to subsequently create the learning model, the penalty for using the feature list rather than the dictionary in the application stage is minimal. It is thus preferable to create and use a single, common feature list for all classes of text messages. Such a common feature list may assign an importance value to each feature word or phrase, the importance value being indicative of the importance of the feature word or phrase in determining the class of a text message from among classes of text messages. The importance value of a word or phrase may be a combination of the importance values of that word or phrase to different classes via feature selection approaches, such as cross-entropy, mutual information entropy, etc.

The feature selection module 152 may select from the list of identified words or phrases (from step 204) the more important words or phrases in identifying a particular class (step 205). For example, the feature selection module 152 may assign an importance value to each word or phrase in the list of identified words or phrases, rank the words or phrases in the list of identified words or phrases according to their respective importance values, and retain the top ranking words or phrases. The retained top ranking words or phrases may be saved in a feature list file (see 206), which may be subsequently deployed in the mobile phone 110 and be called as "features". The retained top ranking words or phrases may be employed in the generation of learning models.

To minimize file system storage space, the feature list may store limited amount information. In one embodiment, the feature list only includes two fields: one field for the feature words or phrases and another field for statistical values used as a parameter for converting the feature words or phrases into vectors. For example, when using SIM, the statistical value for each feature word may be $\log(n/d+a)$, where n is the total number of training text messages, d is the number of text messages in which the feature word has occurred, and a is a constant having a real value from 0 to 1 (e.g., a value of 0.01 in one embodiment). The value for $\log(n/d+a)$ may be used in computing a later described equation for $val(t_{ik})$, which may be used in the vector conversion process in the mobile phone 110. The statistical value may be pre-computed in the server computer to minimize computation in the mobile phone 110. Pre-computation is particularly advantageous because logarithmic computation is specially taxing on computing resources.

In one embodiment, the feature selection module 152 uses a cross-entropy method to select feature words or phrases from words or phrases parsed from the sample text messages (from step 204). Cross-entropy, in general, is well known and is described by the equation:

$$CrossEntropy(t_k) = P(t_k) \sum_i P(C_i|t_k) \log \frac{P(C_i|t_k)}{P(C_i)} \qquad \text{(Eq. 1)}$$

In Eq. 1, $t_k$ is the k-th term (fundamental unit; a term being a word or phrase) in the original term space (i.e., the term space before feature selection, which is the list of identified words or phrases from step 204), where k=1, 2, . . . , n and n is the number of all possible terms in the original term space (which is the number of words or phrases in the list of identified words or phrases in our example). $P(t_k)$ is the occurrence probability of $t_k$. Let $C=\{C_1, C_2, \ldots, C_i, \ldots, C_S\}$ be a finite set of S classes, i=1, 2, . . . , S. $P(C_i)$ means the occurrence probability of the i-th class, and $P(C_i|t_k)$ is the conditional probability of the occurrence of the i-th class for a given $t_k$.

In one embodiment, the feature selection module 152 computes the value (or importance value) of Expected Cross Entropy for each term $t_k$ in original term space, according to which the terms are ranked. With the volume limitation of feature sets or a threshold of the value of Expected Cross Entropy, the top terms in the ranking list (i.e., the top ranking words or phrases in the list of identified words or phrases) may be selected to establish the feature space (i.e., the feature list). With feature selection, the dimension of a vector for each text message may be advantageously represented by a much lower dimensionality to ease further computation, which is important in mobile phones.

Line 210 is included in FIG. 2 to indicate that, depending on implementation, the feature list generated during feature selection may be revised (e.g., remove inappropriate features or add new features) for fine tuning or optimization before the vector conversion process.

For each sample text message in a particular class of text messages, the conversion module 153 creates a corresponding vector having features as fundamental units (step 207). For example, for a particular sample text message, the conversion module 153 may create a single vector for all features (from the feature list) occurring in the sample text message. In one embodiment, the conversion module 153 uses the Vector Space Model (VSM) to represent sample text messages. In VSM, given a set of m training documents (text messages in this example), $D=\{Doc_1, Doc_2, \ldots, Doc_m\}$, for any $Doc_i \epsilon D$, i=1, 2, . . . , m, the training document can be represented as a normalized feature vector $$\overline{V}(Doc_i)=(val(t_{i1}), \ldots, val(t_{ik}), \ldots, val(t_{in})), k=1,2,\ldots,n \qquad \text{(Eq. 2)}$$

where n is the number of all possible terms (e.g., words or phrases) in the space of terms, and $t_{ik}$ represents the k-th term of $Doc_i$. $val(t_{ik})$ is a numeric value used to measure the importance of $t_{ik}$ in $Doc_i$, $0 \leq val(t_{ik}) \leq 1$. With VSM, the problem of processing text messages has been changed to the problem of processing numerical vectors.

Using TF-IDF, $val(t_{ik})$ can be computed using the equation, $$val(t_{ik}) = \frac{tf_{ik} \cdot \log\left(\frac{m}{d_{ik}} + \alpha\right)}{\sqrt{\sum_{k=1}^{n} tf_{ik}^2 \cdot \log^2\left(\frac{m}{d_{ik}} + \alpha\right)}} \qquad \text{(Eq. 3)}$$

where $tf_{ik}$ is the occurrence frequency of $t_{ik}$ in $Doc_i$, $d_{ik}$ indicates the number of training documents in which $t_{ik}$ appears, and $\alpha \epsilon [0,1]$ is a constant for tuning purposes. In one embodiment, $\alpha=0.01$.

Note that is also possible to use a Boolean process to convert a text message into a vector. For example, each item of a vector representing a text message may have a value of logical 1 or logical 0 depending on whether or not a corresponding feature appears in the text message.

After the sample text messages are converted to vectors, the learning module 154 may create a learning model based on the vectors (step 208). For example, when using SIM, the learning module 154 may create a learning model having a single representative vector for each class of text messages. That is, the learning module 154 may create a single representative vector for spam, a single representative vector for legitimate text messages, and so on. In the mobile phone 110, an incoming text messages may be converted to an input vector, which may then be compared to all representative vectors of different classes for similarity. The input vector, and thus the incoming text message, is deemed of the same classification as the representative vector it is most similar. The representative vector for each class of text messages may be generated using a variety of means. For example, the training module 154 may generate a representative vector of a class by using the mean or the middle point of all training vectors belonging to that class. That is, a representative vector for a particular class may be the average of all vectors belonging to that class. The representative vectors may be stored as a learning model (see 209) and subsequently provided to the mobile phone 110.

As another example, assuming there are m text messages $D=\{Doc_1, Doc_2, \ldots Doc_m\}$ used as training samples, anyone of which is assigned a class label $C_{s\,(s=1,\ldots,S)}$, where S is the number of different classes, then there can be $(x_1,l_1), \ldots, (x_m,l_m)$ pairs of training samples with $x_i$ (i=1, . . . m) being the vector representation of $Doc_i$, and $l_i \epsilon C$ (i=1, . . . m) representing the class label of $Doc_i$. Also, assume the training text messages have all been converted to normalized vectors $$\{x_i=(val_{x_i}(t_1), \ldots, val_{x_i}(t_k), \ldots, val_{x_i}(t_n))\}; i=1, \ldots,$$
$$k=1,2,\ldots,n \qquad \text{(Eq. 4)}$$

where n is the dimension or amount of features, $t_k$ represents the k-th item (e.g., feature words or phrases) of the feature space. So for any given class $C_s$, its class pattern (i.e., representative vector) $x^{(s)}$ could be computed as $$x^{(s)} = \left\{ \sum_{l_i \in C_s, i=1,\ldots,m} val_{x_i}(t_k) \Big/ \sum_{l_i \in C_s, i=1,\ldots,m} 1 \right\}_k, \qquad \text{(Eq. 5)}$$
$$k = 1, 2, \ldots, n$$

which can be saved as part of a SIM learning model for all classes s=1, 2, . . . , S.

In one embodiment, the dimension of a representative vector is equal to the number of feature words or phrases in the feature list. Each item of a representative vector for a certain class indicates the typical situation of the numeric representation of the corresponding feature having the same index in feature list with that of the item in the representation vector among all the converted training vectors of that class. Most items (i.e., fundamental units) of a representative vector would be zero. To take advantage of this, the learning model may be formatted to have three parts, namely, (a) class index;

(b) number of non-zero items in the representative vector of this class; and (c) pairs of non-zero items formatted as <index of the feature in the feature list, importance value>.

A learning model may be in a model file with a line for each class of text messages. Each line of the model file may have the aforementioned three parts, with part (c) being the representative vector for that class. Storing only the non-zero items of the representative vectors help reduce the size of the model file. This storage design advantageously allows for a size-efficient learning model.

Figure 3:
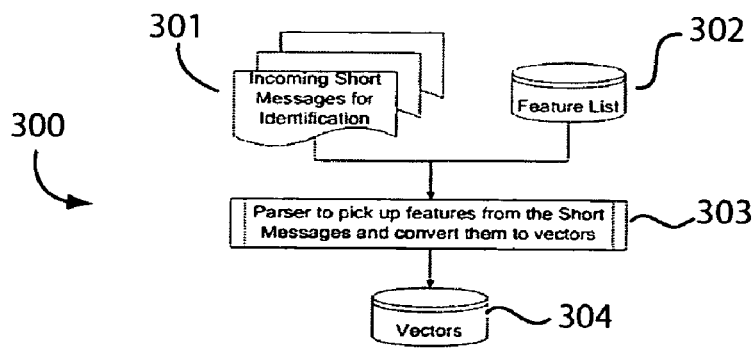
FIGS. 3 and 4 show flow diagrams of methods performed by a content filtering system in the application stage, in accordance with embodiments of the present invention.
Figure 4:
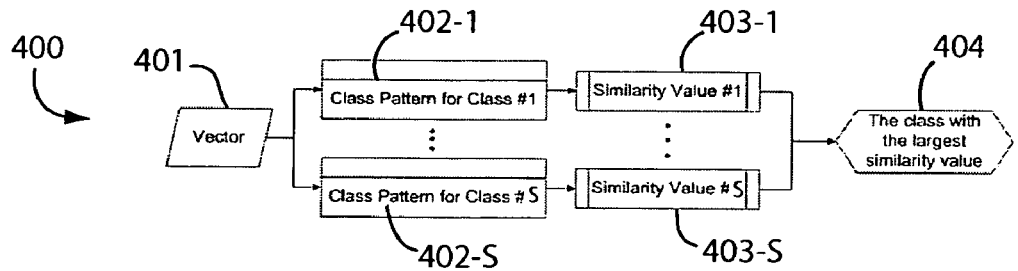

FIGS. 3 and 4 show flow diagrams of methods performed by a content filtering system in the application stage, in accordance with embodiments of the present invention. FIGS. 3 and 4 are explained using the components of the mobile phone 110 shown in FIG. 1. Other components may also be used without detracting from the merits of the present invention.

In the example of FIG. 3, a method 300 converts an incoming text message into a form suitable for processing by the content filtering application 120. The incoming text message may be wirelessly received in the mobile phone 110. In one embodiment, the conversion module 121 parses an incoming SMS text message (see 301) for feature words or phrases included in the feature list 123 (see 302) and creates an input vector (see 304) representing the incoming text message (step 303). The items of the input vector may comprise numeric representations of the feature words or phrases identified as being in the incoming text message. In one embodiment, the incoming text message is represented as an input vector in VSM. This vector conversion process is similar to that performed by the conversion module 153 in the server computer 140 (except for the use of a dictionary in the server computer 140, while a feature list is used in the mobile phone 110).

In the example of FIG. 4, a method 400 determines a classification of the incoming text message. In one embodiment, the prediction module 122 receives the input vector (see 401) generated in the method 300 and compares the similarity of the input vector to all representative vectors of the learning model 124 (steps 402-1, 402-2, ..., 402-S, where S is the number of representative vectors in the learning model 124, and is also the number of classes). For example, the input vector may be compared to the representative vector for spam, to the representative vector for phishing, to the representative vector for legitimate text messages, and so on. The prediction module 122 may compute a similarity value for each similarity comparison, the similarity value being indicative of the similarity of the input vector to the representative vector (steps 403-1, 403-2, ..., 403-S, where S is the number of classes (each having a representative vector) in the learning model 124). The prediction module 122 may deem the input vector, and thus the input text message it represents, to be of the same class as the representative vector to which it is most similar. For example, the prediction module 122 may deem the text message to be of the same class as the representative vector to which the input vector has the highest similarity value (step 404). As a particular example, if the similarity value between the input vector and the representative vector for spam is the highest among the computed similarity values, the prediction module 122 may deem the incoming text message as spam.

In one embodiment, the prediction module 122 uses SIM to evaluate the similarity of the input vector to each representative vector. Generally speaking, SIM allows for evaluation of similarity between two vectors by estimating their cross-angle. Given two vectors $$V=(val_V(t_1), \ldots, val_V(t_k), \ldots, val_V(t_n)) \qquad \text{Eq. 6}$$

and $$U=(val_U(t_1), \ldots, val_U(t_k), \ldots, val_U(t_n)) \qquad \text{Eq. 7}$$

from space k=1, 2, ..., n, where n is the dimension and $t_k$ represents the k-th item (fundamental unit) of the space, $val_V(t_k)$ is a numeric value used to measure the importance of $t_k$ in V, and $val_U(t_k)$ is a numeric value used to measure the importance of $t_k$ in U, with $0 \leq val(t_k) \leq 1$ for both U and V, the similarity between vectors V and U may be estimated using the equation:

$$\text{Sim}(V, U) = \cos(V, U) = \frac{\sum_{k=1}^{n} val_V(t_k) \cdot val_U(t_k)}{\sqrt{\sum_{k=1}^{n} val_V(t_k)^2 \sum_{k=1}^{n} val_U(t_k)^2}} \qquad \text{(Eq. 8)}$$

where $0 \leq \text{Sim}(V,U) \leq 1$.

The bigger the value of the equation Sim(V,U), the smaller the cross-angle, and thus the more similar these two vectors are.

Figure 5:
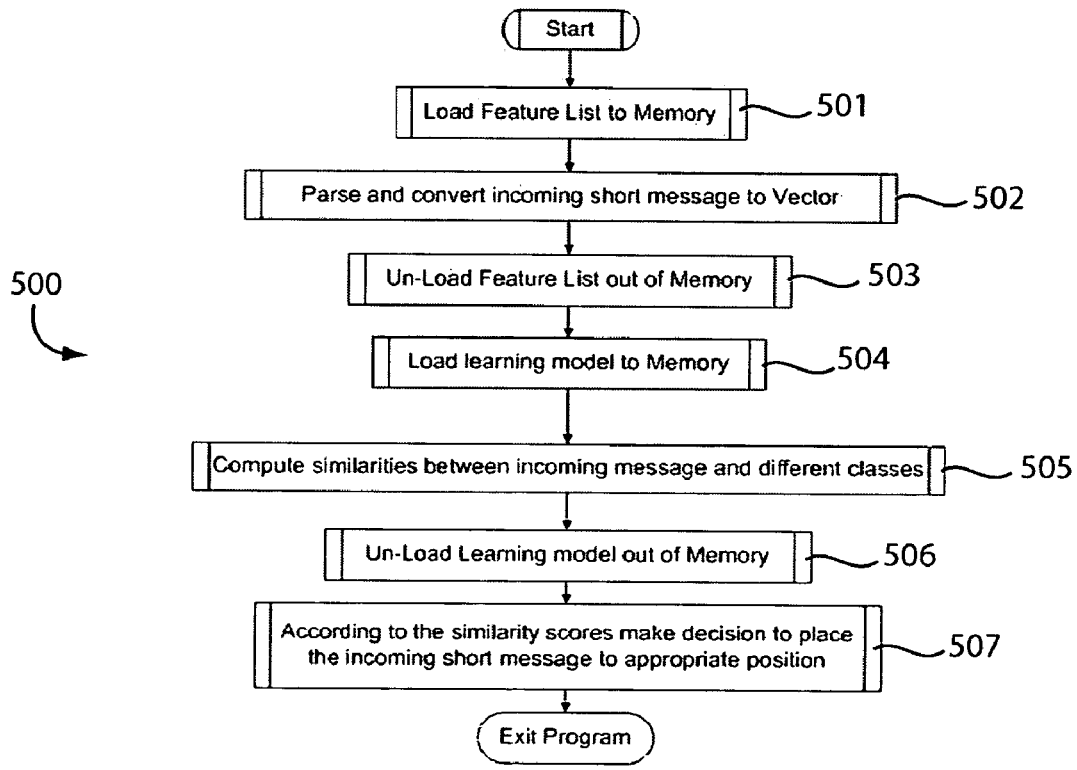
FIG. 5 shows a flow diagram of a method of determining a classification of a text message in accordance with an embodiment of the present invention.

Referring now to FIG. 5, there is shown a flow diagram of a method 500 of determining a classification of a text message in accordance with an embodiment of the present invention. The method 500 may be performed by the mobile phone 110 shown in FIG. 1. Other resource limited devices may also perform the method 500 without detracting from the merits of the present invention.

The method 500 may start upon receiving an incoming SMS text message in the mobile phone 110. At this time, the content filtering application 120 is running in the main memory 113 except for the feature list 123 and the learning model 124.

In step 501, the feature list 123 is loaded into the main memory 113 to allow the conversion module 121 to use the feature list 123 to identify feature words or phrases that may be present in the incoming text message. The loading and unloading of the feature list 123, and other components, to and from the main memory 113 may be performed by the operating system of the mobile phone 110 upon request by the content filtering application 120.

In step 502, the conversion module 121 parses the incoming text message for presence of feature words or phrases enumerated in the feature list 123 and convert the text message into an input vector. The items of the input vector may comprise numeric representations of feature words or phrases occurring in the incoming text message.

In step 503, the feature list 123 is unloaded from the main memory 113. This provides room in the main memory 113, which is advantageous in a memory limited device, such as the mobile phone 110.

In step 504, the learning model 124 is loaded into the main memory 113 to allow the prediction module 122 to access the representative vectors of the learning model for comparison with the input vector generated in the step 502.

In step 505, the prediction module 122 determines the similarity of the input vector to the representative vectors of the learning model 124. Each of the representative vectors represents a class of text messages. In one embodiment, the prediction module 122 calculates a plurality of similarity values (also referred to as "scores"), with each similarity value being indicative of the similarity between the input vector and a representative vector.

In step 506, the learning model 124 is unloaded from the main memory 113.

In step 507, the prediction module 122 classifies the incoming text message based on the similarity of the input vector to the representative vectors. In one embodiment, the prediction module 122 deems the incoming text message to be of the same class as the representative vector that is most similar to the input vector. For example, the prediction module 122 may determine the highest similarity value among those calculated in the step 505, and deem that the incoming text message is of the same class as the corresponding representative vector. As a particular example, if the input vector and the representative vector for spam generated the highest similarity value, the incoming text message may be deemed spam. Similarly, if the input vector and the representative vector for legitimate text message generated the highest similarity value, the incoming text message may be deemed legitimate, and so on.

The above-describe content filtering system is preferably implemented to support a single language (e.g., English or Mandarin Chinese). Multi-language support may be implemented using several approaches. A first approach is to create a set of feature lists and learning models for each language. In that case, the incoming text messages are expected or identified to be in a particular language, allowing for the use of the feature list and learning model for that language.

A second approach involves the use of a Unicode-style feature list containing feature words or phrases from all supported languages. In the second approach, the content filtering system does not have an expectation of or need to identify the supported language incoming text messages will be written in. When determining the class of an incoming text message, the content filtering system may check the incoming text message for feature words or phrases included in the feature list, which in this case includes feature words or phrases from several languages. In this case, the sample text messages should also include text messages written in the supported languages. Text messages to be processed in either the training or application stage are first converted to Unicode-style before any processing.

Comparing the first and second approaches for realizing multi-language support, the first approach may be more precise because it is focused on, and may thus be optimized for, a specific language. The overhead of using a feature list and a learning model for a specific language is also relatively not too large, given that only the feature list and learning model for a particular language need to be deployed in the mobile phone. This is not much of an issue because content filtering systems may be directed for a specific country. In the second approach, the feature list may be several times the size of that in the first approach due to the requirement to support multiple languages in the same feature list. The same is true with the learning model because the dimension of representative vectors is related to the size of the feature list. Also, in the second approach, feature words or phrases with similar meanings may be represented differently in different languages. This may result in learning models that are not as compact and efficient as those of the first approach. The first approach is thus more preferable in a resource limited device.

The feature list and the learning model may be memory-optimized and computation-optimized to further make them suitable for use in a variety of mobile phones. A compacted, optimized memory structure layout and alignment may be employed to minimize the size of the feature list and the learning model. For example, whenever possible, it is preferable to use short data types without overflow. To optimize computation for use in a mobile phone, it is preferable to substitute simple integer operations for complex floating point and double operations whenever possible. Arithmetic targeting may be rewritten to certain data types (e.g., 16-bit unsigned integer or 32-bit unsigned integer) to minimize use or get rid of a large math library for better performance and lower memory usage. Other memory and computation optimization techniques may also be used without detracting from the merits of the present invention.

It should be noted that besides employing a single feature list and a single learning model as described above, there are other viable approaches in establishing the learning system of a content filtering system. For example, multiple feature lists, one for each class, may be used. In that case, for each feature list, a distinct learning model may be created in the training stage. This results in multiple learning models. In the application stage, the multiple learning models can vote for the final decision. This approach may have better accuracy and lower generalization error in classification. However, to minimize resource consumption in resource limited environments, it is preferable to employ the single feature list/single learning model approach for simplicity and efficiency.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of determining a classification of an incoming text message in a mobile phone, the method comprising:

loading a feature list into a main memory of the mobile phone, the feature list being a subset of a dictionary used to parse training text messages that were used to train a content filtering system to classify text messages in a computer separate from the mobile phone;

parsing the incoming text message in the mobile phone for occurrence of feature words included in the feature list;

converting the incoming text message into an input vector in the mobile phone, the input vector comprising numeric representations of feature words identified as occurring in the incoming text message, the feature words identified as occurring in the incoming text message having associated statistical values that are used as a parameter in converting the feature words into the input vector in the mobile phone, the statistical values being pre-computed in a computer separate from the mobile phone;

unloading the feature list from the main memory of the mobile phone;

loading a learning model into the main memory of the mobile phone, the learning model being generated during training of the content filtering system;

determining a classification of the incoming text message in the mobile phone by determining a similarity of the input vector to a first representative vector of the learning model.

2. The method of claim 1 further comprising:
unloading the learning model from the main memory of the mobile phone after computing a similarity of the input vector to representative vectors of the learning model.

3. The method of claim 1 wherein the incoming text message comprises a Short Message Service (SMS) text message.

4. The method of claim 1 wherein the feature words included in the feature list comprise words from the dictionary and selected by rank.

5. The method of claim 1 wherein the classification is selected from a list of classifications that includes spam.

6. The method of claim 1 wherein the first representative vector represents a spam text message.

7. The method of claim 1 wherein the learning model comprises a plurality of representative vectors, each of the representative vectors representing a class of text messages.

8. A content filtering system comprising:
a server computer comprising a dictionary that comprises a plurality of dictionary words, a word segmentation module configured to detect occurrences of dictionary words in a plurality of training text messages, a feature selection module configured to select feature words from among dictionary words occurring in the plurality of training text messages and to generate a feature list that is a subset of the dictionary and comprising the feature words, a first conversion module configured to convert the plurality of training text messages into vectors having numeric representations of selected words as items, and a training module configured generate a learning model; and
a mobile phone configured to receive the feature list and the learning model, the mobile phone comprising a second conversion module configured to detect occurrences of feature words from the feature list in an incoming text message and to convert the incoming text message into an input vector having numeric representations of feature words occurring in the incoming text message as items, the feature words occurring in the incoming text message having associated statistical values that are used as a parameter in converting the incoming text message into the input vector, the statistical values being pre-computed prior to being received in the mobile phone, and a prediction module configured to determine a classification of the incoming text message based on a comparison of the input vector to the learning model.

9. The system of claim 8 wherein the feature list and the learning model do not coexist in a main memory of the mobile phone at any given time.

10. The system of claim 8 wherein the incoming text message comprises an SMS text message.

11. The system of claim 8 wherein the feature list and the learning model are wirelessly transmitted from the server computer to the mobile phone.

12. The system of claim 8 wherein the learning model comprises a plurality of representative vectors to which the input vector is compared to determine the classification of the incoming text message.

13. The system of claim 8 wherein the classification is selected from a group comprising spam, phishing, and legitimate text messages.

14. A method of determining a classification of a text message, the method comprising:
wirelessly receiving an incoming text message in a resource limited device;
parsing the incoming text message in the resource limited device for occurrence of words included in a listing of words, the listing of words being a subset of a dictionary used to generate a learning model in a computer separate from the resource limited device, the listing of words but not the dictionary being available in the resource limited device;
converting the incoming text message into an input vector in the resource limited device, the input vector comprising numeric representations of words occurring in the incoming text message, the words occurring in the incoming message having associated statistical values that are used as a parameter in converting the incoming text message into the input vector in the resource limited device; and
determining a classification of the incoming text message in the resource limited device by comparing the input vector to the learning model.

15. The method of claim 14 wherein determining the classification of the text message by comparing the input vector to the learning model comprises:
computing a similarity value of the input vector to each representative vector of the learning model to generate a plurality of similarity values; and
deeming the incoming text message of a same classification as a representative vector of the learning model to which the input vector is most similar.

16. The method of claim 14 wherein the text message comprises an SMS text message.

* * * * *